(12) United States Patent
Pournazeri et al.

(10) Patent No.: US 12,472,956 B2
(45) Date of Patent: Nov. 18, 2025

(54) METHOD AND SYSTEM FOR DETERMINING THE DESIRED TIRE GRIP IN ACTIVE DOWNFORCE CONTROL

(71) Applicant: GM Global Technology Operations LLC, Detroit, MI (US)

(72) Inventors: Mohammad Pournazeri, Etobicoke (CA); Reza Hajiloo, Richmond Hill (CA); Naser Mehrabi, Richmond Hill (CA); Ehsan Asadi, Markham (CA); Seyedalireza Kasaiezadeh Mahabadi, Novi, MI (US); Gianmarc Coppola, Richmond Hill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 146 days.

(21) Appl. No.: 18/350,508

(22) Filed: Jul. 11, 2023

(65) Prior Publication Data
US 2025/0018956 A1    Jan. 16, 2025

(51) Int. Cl.
*B60W 40/13* (2012.01)
*B62D 37/02* (2006.01)
*G06N 3/04* (2023.01)

(52) U.S. Cl.
CPC .............. *B60W 40/13* (2013.01); *B62D 37/02* (2013.01); *G06N 3/04* (2013.01); *B60W 2530/20* (2013.01)

(58) Field of Classification Search
CPC ... B60W 40/13; B60W 2530/20; B62D 37/02; B62D 35/007; G06N 3/04

(Continued)

(56) References Cited

U.S. PATENT DOCUMENTS

| | | |
|---|---|---|
| 4,810,022 A | 3/1989 | Takagi et al. |
| 5,090,766 A | 2/1992 | Ito et al. |

(Continued)

FOREIGN PATENT DOCUMENTS

DE    102021101716 A1    8/2021

OTHER PUBLICATIONS

D. Papagiannis, E. Tsioumas, M. Koseoglou, N. Jabbourand C. Mademlis, "Enhancing the Braking Performance of a Vehicle Through the Proper Control of the Active Suspension System," in IEEE Access, vol. 9, pp. 155936-155948, 2021, doi: 10.1109/ ACCESS. 2021.3129263. (Year: 2021).

(Continued)

*Primary Examiner* — Andrew R Dyer
(74) *Attorney, Agent, or Firm* — Vivacqua Crane, PLLC

(57) ABSTRACT

A method for downforce control includes receiving sensor data from sensors, using a feedforward control to determine a first requested normal force at the first axle of the vehicle and a second requested normal force at the second axle of the vehicle and the sensor data, using a feedback control to determine a first requested normal force adjustment at the first axle of the vehicle and a second requested normal force adjustment at the second axle of the vehicle using the sensor data, fusing the first requested normal force at the first axle of the vehicle with the first requested normal force adjustment to determine a first-adjusted normal force request at the first axle, and fusing the second requested normal force with the second requested normal force adjustment to determine a second-adjusted normal force request at the second axle.

20 Claims, 2 Drawing Sheets

(58) Field of Classification Search
USPC .............................................................. 701/1
See application file for complete search history.

(56) References Cited

U.S. PATENT DOCUMENTS

| | | | |
|---|---|---|---|
| 2007/0156315 A1 | 7/2007 | Raab et al. | |
| 2019/0100194 A1* | 4/2019 | Fahland | .......... B60W 30/18109 |
| 2019/0263458 A1* | 8/2019 | Fahland | ............... B62D 35/008 |
| 2022/0348212 A1 | 11/2022 | Hars et al. | |
| 2023/0038657 A1 | 2/2023 | Bartels | |
| 2023/0039754 A1 | 2/2023 | Bartels | |
| 2023/0399063 A1 | 12/2023 | Soštaric et al. | |

OTHER PUBLICATIONS

J. Cao, H. Liu, P. Li and D. J. Brown, "State of the Art in Vehicle Active Suspension Adaptive Control Systems Based on Intelligent Methodologies," in IEEE Transactions on Intelligent Transportation Systems, vol. 9, No. 3, pp. 392-405, Sep. 2008, doi: 10.1109/TITS.2008.928244. (Year: 2008).

Yingmin Jia, "Robust control with decoupling performance for steering and traction of 4WS vehicles under velocity-varying motion," in IEEE Transactions on Control Systems Technology, vol. 8, No. 3, pp. 554-569, May 2000, doi: 10.1109/87.845885. (Year: 2000).

\* cited by examiner

METHOD AND SYSTEM FOR DETERMINING THE DESIRED TIRE GRIP IN ACTIVE DOWNFORCE CONTROL

INTRODUCTION

The present disclosure relates to methods and systems for determining the desired tire grip in active downforce control of a vehicle.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Downforce refers to the vertical load created by a vehicle's aerodynamic parts during motion. Some vehicles include actuators for controlling the downforce.

SUMMARY

The present disclosure describes a method for determining the desired tire grip in active downforce control of a vehicle. The method also includes receiving sensor data from a plurality of sensors of a vehicle, where the vehicle includes a vehicle body, a first axle coupled to the vehicle body, a second axle coupled to the vehicle body, a first aerodynamic actuator coupled to the vehicle body, and a second aerodynamic actuator coupled to the vehicle body, the first aerodynamic actuator includes a first aerodynamic body movable relative to the vehicle body, the second aerodynamic actuator includes a second aerodynamic body movable relative to the vehicle body. The method also includes using a feedforward control to determine a first requested normal force at the first axle of the vehicle and a second requested normal force at the second axle of the vehicle using tire friction circle and the sensor data. The method also includes using a feedback control to determine a first requested normal force adjustment at the first axle of the vehicle and a second requested normal force adjustment at the second axle of the vehicle using the sensor data. The method also includes fusing the first requested normal force at the first axle of the vehicle with the first requested normal force adjustment to determine a first-adjusted normal force request at the first axle. The method also includes fusing the second requested normal force with the second requested normal force adjustment to determine a second-adjusted normal force request at the second axle. The method also includes determining a first position of the first aerodynamic body relative to the vehicle body and a second position of the second aerodynamic body relative to the vehicle body based on the first-adjusted normal force request and the second-adjusted normal force request, respectively. The method also includes commanding the first aerodynamic actuator to move the first aerodynamic body to the first position relative to the vehicle body. The method also includes commanding the second aerodynamic actuator to move the second aerodynamic body to the second position relative to the vehicle body. The method described in this paragraph improves vehicle technology by determining how much extra tire grip is needed to be realized by the first aerodynamic actuator and the second aerodynamic actuator to keep the vehicle stable during certain driving scenarios. This would be an important information to be shared between vertical and planar motion controls.

Implementations may include one or more of the following features. The method may include commanding the second aerodynamic actuator to move the second aerodynamic body to the second position relative to the vehicle body. The method may include determining a first tire-capacity normal force adjustment at the first axle and a second tire-capacity normal force adjustment at the second axle. The method may include determining a first tire-capacity normal force adjustment at the first axle and a second tire-capacity normal force adjustment at the second axle. The method may include determining a first understeer angle-based normal force adjustment at the first axle and a second understeer angle-based normal force adjustment at the second axle. The method may include determining a first understeer angle-based normal force adjustment at the first axle and a second understeer angle-based normal force adjustment at the second axle. The method may include determining a first wheel-stability based normal force adjustment at the first axle and a second wheel-stability based normal force adjustment at the second axle. The method may include determining a first wheel-stability based normal force adjustment at the first axle and a second wheel-stability based normal force adjustment at the second axle. The method may include determining a first body-stability based normal force adjustment at the first axle and a second body-stability based normal force adjustment at the second axle. The method may include determining a first body-stability based normal force adjustment at the first axle and a second body-stability based normal force adjustment at the second axle. The method may include fusing the first tire-capacity normal force adjustment, the first understeer angle-based normal force adjustment, the first wheel-stability based normal force adjustment, and the first body-stability based normal force adjustment to determine the first requested normal force adjustment. The method may include fusing the second tire-capacity normal force adjustment, the second understeer angle-based normal force adjustment, the second wheel-stability based normal force adjustment, and the second body-stability based normal force adjustment to determine the second requested normal force adjustment. The method may include using a neural network or fuzzy logic to fuse the first requested normal force at the first axle of the vehicle with the first requested normal force adjustment and to fuse the second requested normal force with the second requested normal force adjustment.

The present application also describes a tangible, non-transitory, machine-readable medium, including machine-readable instructions. When executed by a processor, the machine-readable instructions cause the processor to execute the method described above.

The present disclosure also describes a vehicle. The vehicle includes a vehicle body, a first axle coupled to the vehicle body, a second axle coupled to the vehicle body, a plurality of sensors disposed within the vehicle body, and a vehicle controller disposed within the vehicle body. The vehicle controller is in communication with the sensors. The vehicle controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
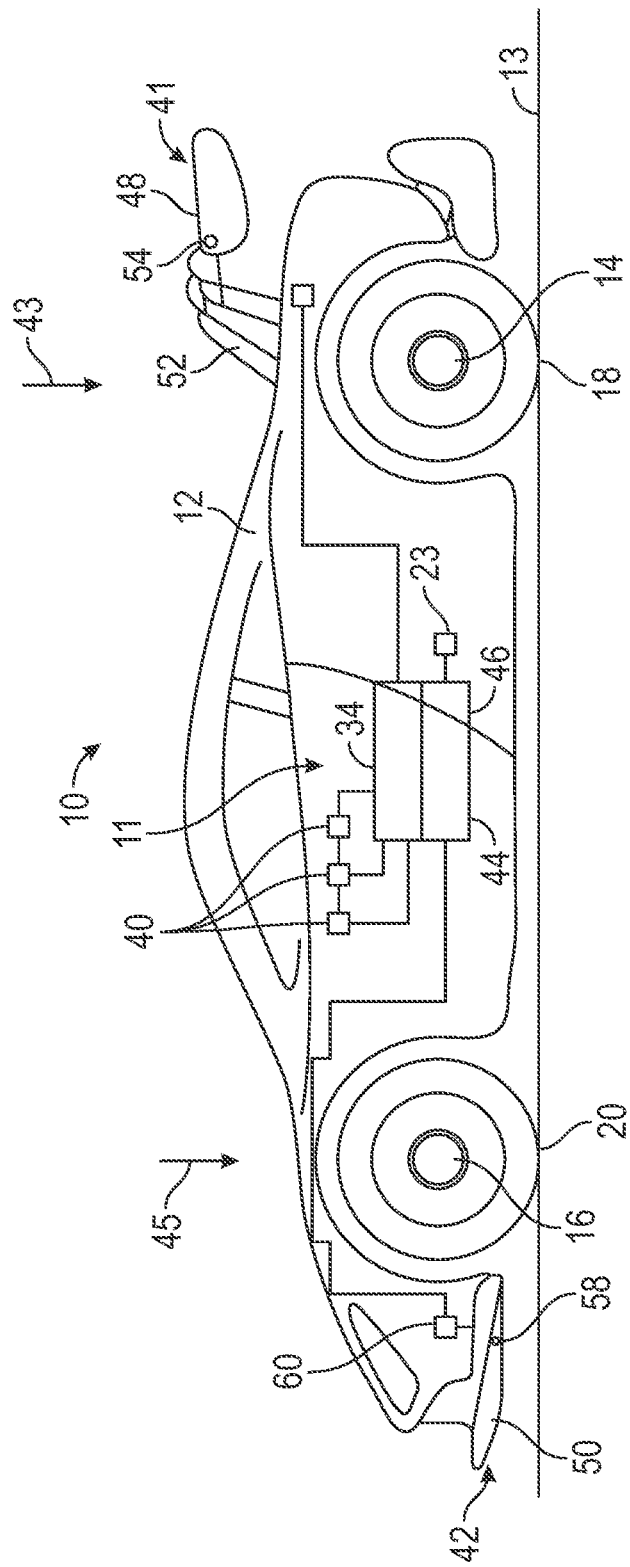
FIG. 1 is a schematic side view of a vehicle including a system for data driven downforce control.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 includes (or is in communication with) a system 11 for data driven downforce control. While the system 11 is shown inside the vehicle 10, it is contemplated that the system 11 may be outside of the vehicle 10. As a non-limiting example, the system 11 may be in wireless communication with the vehicle 10. Although the vehicle 10 is shown as a coupe, it is envisioned that that vehicle 10 may be another type of vehicle, such as a pickup truck, a sedan, a sport utility vehicle (SUVs), a recreational vehicle (RVs), etc. The system 11 determines how much extra tire grip is needed to be realized by a first aerodynamic actuator 41 and a second aerodynamic actuator 42 to keep the vehicle 10 stable during certain driving scenarios. This would be an important information to be shared between vertical and planar motion controls. Different stability criteria including axle, wheel and body stabilities are integrated together to calculate the amount of extra grip needed at each of a first axle 14 and a second axle 16 of the vehicle 10.

The system 11 is used for active downforce and contains both a feedforward part for fast response and feedback part for robustness to uncertainties and for disturbance rejection. Specifically, the system 11 calculates the correct desired normal force at first axle 14 and the second axle 16 to keep the vehicle 10 stable with minimal drag. The feedback portion of the system 11 is solely responsible for adjustment of the feedforward portion. The system 11 also includes sub-control modules that independently calculate the correct adjustment needed for desired normal force from feedforward control using tire-friction ellipse margin, axle stability, body stability and wheel stability. The final adjustment to the desired normal force is then decided in a fusion logic that can be tuned depending on several factors. The fusion of all the sub-control algorithms can be tailored depending on vehicle platform and application. In summary, a physics-based open loop algorithm and a closed-loop algorithm (e.g., a feedback control) are integrated and fused together to better estimate how much extra tire grip is needed at the first axle 14 and the second axle 16 of the vehicle 10.

Further, the vehicle 10 includes a vehicle controller 34 and one or more sensors 40 in communication with the vehicle controller 34. The sensors 40 collect information and generate sensor data indicative of the collected information. As non-limiting examples, the sensors 40 may include Global Navigation Satellite System (GNSS) transceivers or receivers, yaw rate sensors, ride height sensors, speed sensors, lidars, radars, ultrasonic sensors, and cameras, among others. The GNSS transceivers or receivers are configured to detect the location of the vehicle 10 in the globe. The speed sensors are configured to detect the speed of the vehicle 10. The yaw rate sensors are configured to determine the heading of the vehicle 10. The cameras may have a field of view large enough to capture images in front, in the rear, and in the sides of the vehicle 10. The ride height sensors are configured to measure the right height of the vehicle 10. The ultrasonic sensor may detect static and/or dynamic objects.

The vehicle controller 34 is programmed to receive sensor data from the sensors 40 and includes at least one processor 44 and a non-transitory computer readable storage device or media 46. The processor 44 may be a custom-made processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions.

Figure 2:
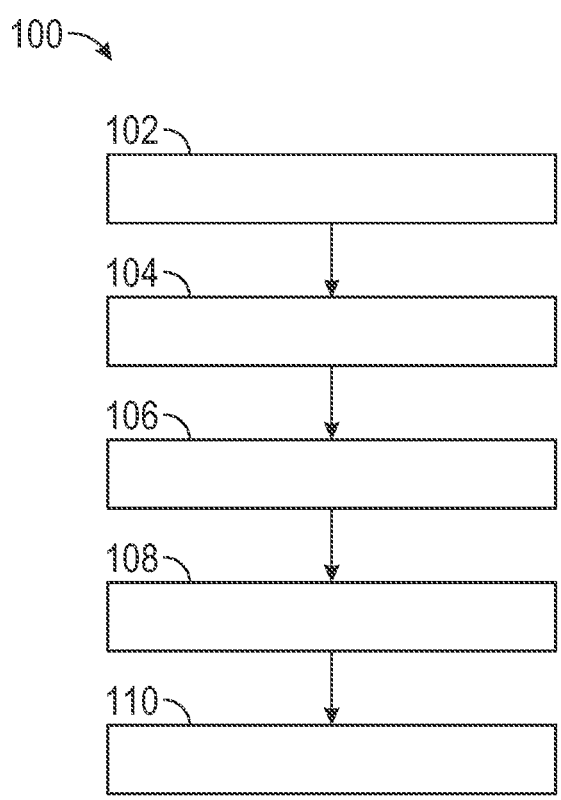
FIG. 2 a flowchart of a method for data driven downforce control.

The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the vehicle 10, and generate control signals to the actuators (e.g., first aerodynamic actuator and/or second aerodynamic actuator 42) to automatically control the components of the vehicle 10 based on the logic, calculations, methods, and/or algorithms. Although a single vehicle controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the vehicle controller 34 are embodied in the system 11. The non-transitory computer readable storage device or media 46 includes machine-readable instructions (shown, for example, in FIG. 2), that when executed by the one or more processors, cause the processors 44 to execute the method 100 (FIG. 2).

The vehicle 10 includes a vehicle body 12, a first or rear axle 14, and a second or front axle 16. The first axle 14 and the second axle 16 are coupled to the vehicle body 12. Further, each of the first axle 14 and the second axle 16 are configured to rotate relative to the vehicle body 12. The vehicle 10 further includes one or more first or rear tires 18 coupled to the first axle 14 and one or more second or front tires 20 coupled to the second axle 16.

The vehicle 10 includes a first or rear aerodynamic actuator 41 and a second or front aerodynamic actuator 42 each in communication with the vehicle controller 34. The first aerodynamic actuator 41 includes the first aerodynamic body 48, and the second aerodynamic actuator 42 includes a second aerodynamic body 50. Each of the first aerodynamic body 48 and the second aerodynamic body 50 may be configured as a wing-shaped spoiler. In the present disclosure, the term "wing-shaped" is defined as having a shape of a wing, i.e., a fin having a shape of an airfoil defined by a streamlined cross-sectional shape producing lift for flight or propulsion through a fluid. The term "spoiler" means an aerodynamic device capable of disrupting air movement across the vehicle 10 while the vehicle 10 is in motion, thereby reducing drag and/or inducing an aerodynamic downforce on the vehicle 10. The term "downforce" means a force component that is perpendicular to the direction of relative motion of the vehicle 10, i.e., in the longitudinal direction, toward the road surface 13. For example, the spoiler can diffuse air by increasing the amount of turbulence flowing over it. The first aerodynamic actuator 41 is closer to the first axle 14 than to the second axle 16 to control a rear downforce 43 at or near the first axle 14. The second aerodynamic actuator 42 is closer to the second axle 16 than to the first axle 14 to control a front downforce 45 at or near the second axle 16. The rear downforce 43 and the front downforce 45 may be determined using sensor data from the sensors 40 (e.g., ride height sensors).

The first aerodynamic actuator 41 includes a support 52 directly coupled to the vehicle body 12 and one or more first pivots 54 (e.g., pivot pin, pivot mechanism, etc.) pivotally coupling the first aerodynamic body 48 to the vehicle body 12. Accordingly, the first aerodynamic body 48 is movable (e.g., pivotable) relative to the vehicle body 12. The first aerodynamic actuator 41 includes a first electric motor 56 (or another suitable machine) in communication with the vehicle controller 34 and coupled to the first aerodynamic body 48 through the first pivot 54. The vehicle controller 34 is therefore programmed to actuate the first electric motor 56 to move the first aerodynamic body 48 relative to the vehicle body 12.

The second aerodynamic actuator 42 is coupled to the vehicle body 12 and includes one or more second pivots 58 (e.g., pivot pin, pivot mechanism, etc.) pivotally coupling the second aerodynamic body 50 to the vehicle body 12. Accordingly, the second aerodynamic body 50 is movable (e.g., pivotable) relative to the vehicle body 12. The second aerodynamic actuator 42 includes a second electric motor 60 (or another suitable machine) in communication with the vehicle controller 34 and coupled to the second aerodynamic body 50 through the second pivot 58. The vehicle controller 34 is therefore programmed to actuate the second electric motor 60 to move the second aerodynamic body 50 relative to the vehicle body 12.

The vehicle 10 includes a user interface 23 in communication with the vehicle controller 34. The user interface 23 may be, for example, a touchscreen in the dashboard and may include, but is not limited to, an alarm, such as one or more speakers to provide an audible sound, haptic feedback in a vehicle seat or other object, one or more displays, one or more microphones, one or more lights, and/or other devices suitable to provide a notification. The user interface 23 is in electronic communication with the vehicle controller 34 and is configured to receive inputs from the hearing-impaired vehicle occupant 25 (e.g., a vehicle user or a vehicle passenger). For example, the user interface 23 may include a touch screen and/or buttons configured to receive inputs from the vehicle occupant. Accordingly, the vehicle controller 34 is configured to receive inputs from the vehicle occupant via the user interface 23 and to provide an output (e.g., audible, haptic, and/or visible notifications) to the vehicle occupant.

FIG. 2 is a flowchart of a method 100 for downforce control. The method 100 may be executed by the vehicle controller 34 and uses a physics-based open loop that calculates the normal force request at the first axle 14 and the second axle 16 using drive inputs, vehicle measured and estimated signals (e.g., sensor data) and also axle, wheel, and body stability checks. High control performance is achieved without extensive calibration as the control is based on vehicle physical correlations instead of calibration tables. Minimal-recalibration is required if any change is made to the vehicle 10. Soley the parameters related to that change needs to be re-calibrated. The method 100 calculates the desired normal forces at each of the first axle 14 and the second axle 16 of the vehicle 10. As a result, the method 100 does not require accurate downforce estimation as the normal force estimation may be used as a backup.

The method 100 begins at block 102. At block 102, the vehicle controller 34 receives inputs, such as sensor data from the sensors 40, driver inputs, stability triggers, and vehicle feedback. As non-limiting examples, the vehicle controller 34 may receive the vehicle longitudinal acceleration, vehicle lateral acceleration, vehicle longitudinal velocity, ride height data, front road wheel angle, brake pedal pressure or position, throttle position, estimated coefficient of friction between the road surface 13 and at least one of the first tires 18 or second tires 20, steering wheel angle, normal force, downforce, pneumatic trail, understeer angle, slip slope, and wheel ground speed. After the vehicle controller 34 receives the inputs, the method 100 continues to block 104.

At block 104, the vehicle controller 34 uses a feedforward control to determine a first requested normal force at the first axle 14 of the vehicle 10 and a second requested normal force at the second axle 16 of the vehicle 10 using physics-based model, such as the half-car model and the inputs discussed above, such as the sensor data from the sensors 40. The feedforward control is based on the idea of calculating the required front and lateral forces to achieve the desired lateral acceleration based on the steering input and the vehicle velocity and at the same time assure that both the first axle 14 and the second axle 16 are simultaneously saturated ruing limit handling driving scenarios. The physics-based model (e.g., the half-car model) may use the steering wheel angle, the throttle position, the brake pedal pressure or position, and the longitudinal force at each of the first axle 14 and the second axle 16 to determine the first requested normal force at the first axle 14 of the vehicle 10 and a second requested normal force at the second axle 16 of the vehicle 10. As non-limiting examples, U.S. Pat. No. 10,065,688 to Heil et al., filed on Jul. 18, 2016, describes a feedforward control and is incorporated by reference herein in its entirety. Next, the method 100 proceeds to block 106.

At block 106, the vehicle controller 34 uses a feedback control to determine a first requested normal force adjustment at the first axle 14 of the vehicle 10 and a second requested normal force adjustment at the second axle 16 of the vehicle 10 using the sensor data. Specifically, the vehicle controller 34 includes sub-control modules that independently calculate the correct adjustment needed for desired normal force from the feedforward control using tire-friction ellipse margin, axle stability, body stability and wheel stability. Regarding the tire-friction ellipse margin, the capacities of the first axle 14 and the second axle 16 are monitored by locating the longitudinal force component, the lateral force component, and the vertical force component on the tire-friction ellipse. U.S. Patent Publication No. US202/20161874 by Nahidi et al, filed on Nov. 24, 2020, describes a using the tire-friction ellipse for downforce control and is incorporated herein by reference in its entirety. The first tire-capacity normal force adjustment at the first axle 14 and the second tire-capacity normal force adjustment at the second axle 16 are calculated to keep the safety margin away from the tire-friction ellipse. Due to uncertainties in the estimated coefficient of friction between the road surface 13 the first tires 18 and the estimated coefficient of friction between the road surface 13 and the second tires 20, the front and rear friction coefficients used in the tire-friction ellipse are adjusted using pneumatic trail and slip slope stability signals. As a non-limiting example, the following equation may be used to determine the first tire-capacity normal force adjustment at the first axle 14 and the second tire-capacity normal force adjustment at the second axle 16:

$$\Delta F_{z,req} = \frac{\sqrt[n]{F_x^n + F_y^n}}{(1 - \text{margin}\%)\mu} - F_z \qquad \text{Eq. 1}$$

where:

$\Delta F_{z,req}$ is the first tire-capacity normal force adjustment at the first axle 14 or the second tire-capacity normal force adjustment at the second axle 16;

$F_z$ is an estimation of the vertical force component at the first axle 14 or the second axle 16 while the vehicle 10 is in motion;

$F_x$ is an estimation of the longitudinal force component at the first axle 14 or the second axle 16 while the vehicle 10 is in motion;

$F_y$ is an estimation of the lateral force component at the first axle 14 or the second axle 16 while the vehicle 10 is in motion;

margin % is the stability margin from tire-friction ellipse;

n is the number of axles in the vehicle 10; and

μ is the estimated coefficient of friction between the road surface 13 and at least one of the first tires 18 or second tires 20.

As discussed above, the front and rear friction coefficients used in the tire-friction ellipse are adjusted using pneumatic trail and slip slope stability signals. For example, if the pneumatic trail is saturated and the friction ellipse is not saturated, the front friction coefficients may be decreased. If the pneumatic trail is not saturated and the friction ellipse is saturated, the front friction coefficients may be decreased. For example, if the slip slope is saturated and the friction ellipse is not saturated, the rear friction coefficients may be decreased. If the slip slope is not saturated and the friction ellipse is saturated, the rear friction coefficients may be decreased. If other situations, neither the front friction coefficient nor rear friction coefficient are adjusted.

Block 106 also entails determining a first understeer angle-based normal force adjustment at the first axle 14 and a second understeer angle-based normal force adjustment at the second axle 16 using the understeer angle, the position of the first aerodynamic body 48 movable relative to the vehicle body 12, and the position of the second aerodynamic body 50 movable relative to the vehicle body 12. The understeer angle is used to adjust the required extra tire grip during high understeer and oversteer situations. In relatively high understeer situations, the first understeer angle-based normal force adjustment at the first axle 14 is increased if the second aerodynamic actuator 42 is not fully deployed, and the first understeer angle-based normal force adjustment at the first axle 14 is decreased if the second aerodynamic actuator 42 is fully deployed. In relatively high oversteer situations, the second understeer angle-based normal force adjustment at the second axle 16 is increased if the first aerodynamic actuator 41 is not fully deployed, and the second understeer angle-based normal force adjustment at the second axle 16 is reduced if the first aerodynamic actuator 41 is fully deployed.

Block 106 also entails determining a first wheel-stability based normal force adjustment at the first axle 14 and a second wheel-stability based normal force adjustment at the second axle 16. Because the front wheels experience no accelerating torque, the difference between the rear and front wheel ground speeds can be used as an index to show the rear wheel stability status. To do so, the difference between the average rear wheel ground speed and the average front wheel ground speed is multiplied by a calibrated average front wheel ground speed. Then, if the result of this calculation is greater than a threshold, then that result is considered the wheel slip index. The wheel slip index is used to calculate the first wheel-stability based normal force adjustment at the first axle 14 and the second wheel-stability based normal force adjustment at the second axle 16.

Block 106 also entails determining a first body-stability based normal force adjustment at the first axle 14 and a second body-stability based normal force adjustment at the second axle 16. The sideslip-yaw rate phase plane is monitored to detect early indication of body instability. When the early indication flag is raised, the variations in lateral accelerations are monitored. If the monitored difference in lateral acceleration at predetermined times is greater than a predetermined threshold, then the body stability control is enabled. After block 106, the method 100 continues to block 108.

At block 108, the vehicle controller 34 fuses the first tire-capacity normal force adjustment, the first understeer angle-based normal force adjustment, the first wheel-stability based normal force adjustment, and the first body-stability based normal force adjustment to determine the first requested normal force adjustment to determine the first requested normal force adjustment at the first axle 14 of the vehicle 10. Also, the vehicle controller 34 fuses the second tire-capacity normal force adjustment, the second understeer angle-based normal force adjustment, the second wheel-stability based normal force adjustment, and the second body-stability based normal force adjustment to determine the second requested normal force adjustment at the second axle 16 of the vehicle 10. For fusion, the vehicle controller 34 may select the greatest of the first tire-capacity normal force adjustment, the first understeer angle-based normal force adjustment, the first wheel-stability based normal force adjustment, and the first body-stability based normal force adjustment to determine the first requested normal force adjustment at the first axle 14 of the vehicle 10. Similarly, for fusion, the vehicle controller 34 may select the greatest of the second tire-capacity normal force adjustment, the second understeer angle-based normal force adjustment, the second wheel-stability based normal force adjustment, and the second body-stability based normal force adjustment to determine the second requested normal force adjustment at the second axle 16 of the vehicle 10. Then, the vehicle controller 34 fuses the first requested normal force at the first axle 14 of the vehicle 10 (determined using the feedforward control) with the first requested normal force adjustment by, for example adding the first requested normal force adjustment to the first requested normal force, thereby determining a first-adjusted normal force request at the first axle 14. Also, the vehicle controller 34 fuses the second requested normal force at the second axle 16 (determined by the feedforward control) with the second requested normal force adjustment by, for example, adding the second requested normal force adjustment to the second requested normal force, thereby determining a second-adjusted normal force request at the second axle 16. Next, each of the adjusted normal force request and the second-adjusted normal force request is filtered with a maximum normal force and a minimum normal force. Thus, during fusion, all the normal force request adjustments from the feedback control are combined with the normal force requests from the feedforward control. Alternatively, instead of using the greatest of the adjustments determined using feedback control, the vehicle controller 34 may use a weighted average method with more advance weight scheduling algorithm to fuse the first requested normal force adjustment and the first requested normal force adjustment. A neural network or a fuzzy logic may be used to execute any of the fusion operations described herein. For example, a fuzzy logic or a neutral network may be used to fuse the first requested normal force at the first axle of the vehicle with the first requested normal force adjustment and to fuse the second requested normal force with the second requested normal force adjustment. Then, the method 100 proceeds to block 110.

At block 110, the vehicle controller 34 determines a position (i.e., a first position) of the first aerodynamic body 48 relative to the vehicle body 12 based on the first-adjusted normal force request and a position (i.e., a second position) of the second aerodynamic body 50 relative to the vehicle body 12 based on the second-adjusted normal force request. Further, the vehicle controller 34 commands the first aerodynamic actuator 41 to move the first aerodynamic body 41 to the first position relative to the vehicle body 12 and commands the second aerodynamic actuator 42 to move the second aerodynamic body 50 to the second position relative to the vehicle body 12.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for downforce control, comprising:
receiving sensor data from a plurality of sensors of a vehicle, wherein the vehicle includes a vehicle body, a first axle coupled to the vehicle body, a second axle coupled to the vehicle body, a first aerodynamic actuator coupled to the vehicle body, and a second aerodynamic actuator coupled to the vehicle body, the first aerodynamic actuator includes a first aerodynamic body movable relative to the vehicle body, the second aerodynamic actuator includes a second aerodynamic body movable relative to the vehicle body;
using a feedforward control to determine a first requested normal force at the first axle of the vehicle and a second requested normal force at the second axle of the vehicle using the sensor data, wherein the feedforward control is physics-based and calculates a required front force and a required lateral force to achieve a desired lateral acceleration based on a steering input and a vehicle velocity from the sensor data;
using a feedback control to determine a first requested normal force adjustment at the first axle of the vehicle and a second requested normal force adjustment at the second axle of the vehicle using the sensor data, wherein the feedback control includes sub-control modules that independently calculate adjustments using tire-friction ellipse margin, axle stability, body stability, and wheel stability;

fusing the first requested normal force at the first axle of the vehicle from the feedforward control with the first requested normal force adjustment from the feedback control to determine a first-adjusted normal force request at the first axle by adding the first requested normal force adjustment to the first requested normal force to determine a first-adjusted normal force request at the first axle;

fusing the second requested normal force from the feedforward control with the second requested normal force adjustment from the feedback control to determine a second-adjusted normal force request at the second axle by adding the second requested normal force adjustment to the second requested normal force to determine a second-adjusted normal force request at the second axle;

determining a first position of the first aerodynamic body relative to the vehicle body and a second position of the second aerodynamic body relative to the vehicle body based on the first-adjusted normal force request and the second-adjusted normal force request, respectively;

commanding the first aerodynamic actuator to move the first aerodynamic body to the first position relative to the vehicle body; and commanding the second aerodynamic actuator to move the second aerodynamic body to the second position relative to the vehicle body.

2. The method of claim 1, wherein using the feedback control to determine the first requested normal force adjustment at the first axle of the vehicle and the second requested normal force adjustment at the second axle of the vehicle using the sensor data includes determining a first tire-capacity normal force adjustment at the first axle and a second tire-capacity normal force adjustment at the second axle.

3. The method of claim 2, wherein using the feedback control to determine the first requested normal force adjustment at the first axle of the vehicle and the second requested normal force adjustment at the second axle of the vehicle using the sensor data includes determining a first understeer angle-based normal force adjustment at the first axle and a second understeer angle-based normal force adjustment at the second axle.

4. The method of claim 3, wherein using the feedback control to determine the first requested normal force adjustment at the first axle of the vehicle and the second requested normal force adjustment at the second axle of the vehicle using the sensor data includes determining a first wheel-stability based normal force adjustment at the first axle and a second wheel-stability based normal force adjustment at the second axle.

5. The method of claim 4, wherein using the feedback control to determine the first requested normal force adjustment at the first axle of the vehicle and the second requested normal force adjustment at the second axle of the vehicle using the sensor data includes determining a first body-stability based normal force adjustment at the first axle and a second body-stability based normal force adjustment at the second axle.

6. The method of claim 5, further comprising:

fusing the first tire-capacity normal force adjustment, the first understeer angle-based normal force adjustment, the first wheel-stability based normal force adjustment, and the first body-stability based normal force adjustment to determine the first requested normal force adjustment; and fusing the second tire-capacity normal force adjustment, the second understeer angle-based normal force adjustment, the second wheel-stability based normal force adjustment, and the second body-stability based normal force adjustment to determine the second requested normal force adjustment.

7. The method of claim 6, further comprising using a neural network to fuse the first requested normal force at the first axle of the vehicle with the first requested normal force adjustment and to fuse the second requested normal force with the second requested normal force adjustment.

8. A tangible, non-transitory, machine-readable medium, comprising machine-readable instructions, that when executed by a processor, cause the processor to:

receive sensor data from a plurality of sensors of a vehicle, wherein the vehicle includes a vehicle body, a first axle coupled to the vehicle body, a second axle coupled to the vehicle body, a first aerodynamic actuator coupled to the vehicle body, and a second aerodynamic actuator coupled to the vehicle body, the first aerodynamic actuator includes a first aerodynamic body movable relative to the vehicle body, the second aerodynamic actuator includes a second aerodynamic body movable relative to the vehicle body;

use a physics-based feedforward control to determine a first requested normal force at the first axle of the vehicle and a second requested normal force at the second axle of the vehicle using the sensor data, wherein the physics-based feedforward control calculates required front and lateral forces to achieve desired lateral acceleration based on steering input and vehicle velocity;

use a feedback control to determine a first requested normal force adjustment at the first axle of the vehicle and a second requested normal force adjustment at the second axle of the vehicle using the sensor data, wherein the feedback control includes sub-control modules that independently calculate adjustments using tire-friction ellipse margin, axle stability, body stability, and wheel stability;

fuse the first requested normal force at the first axle of the vehicle with the first requested normal force adjustment to determine a first-adjusted normal force request at the first axle by adding the first requested normal force adjustment to the first requested normal force to determine a first-adjusted normal force request at the first axle;

fuse the second requested normal force with the second requested normal force adjustment to determine a second-adjusted normal force request at the second axle by adding the second requested normal force adjustment to the second requested normal force to determine a second-adjusted normal force request at the second axle;

determine a first position of the first aerodynamic body relative to the vehicle body and a second position of the second aerodynamic body relative to the vehicle body based on the first-adjusted normal force request and the second-adjusted normal force request, respectively;

command the first aerodynamic actuator to move the first aerodynamic body to the first position relative to the vehicle body; and command the second aerodynamic actuator to move the second aerodynamic body to the second position relative to the vehicle body.

9. The tangible, non-transitory, machine-readable medium of claim 8, wherein the tangible, non-transitory, machine-readable medium further comprising machine-readable instructions, that when executed by the processor, causes the processor to:
determine a first tire-capacity normal force adjustment at the first axle and a second tire-capacity normal force adjustment at the second axle.

10. The tangible, non-transitory, machine-readable medium of claim 9, wherein the tangible, non-transitory, machine-readable medium further comprising machine-readable instructions, that when executed by the processor, causes the processor to:
determine a first understeer angle-based normal force adjustment at the first axle and a second understeer angle-based normal force adjustment at the second axle.

11. The tangible, non-transitory, machine-readable medium of claim 10, wherein the tangible, non-transitory, machine-readable medium further comprising machine-readable instructions, that when executed by the processor, causes the processor to:
determine a first wheel-stability based normal force adjustment at the first axle and a second wheel-stability based normal force adjustment at the second axle.

12. The tangible, non-transitory, machine-readable medium of claim 11, wherein the tangible, non-transitory, machine-readable medium further comprising machine-readable instructions, that when executed by the processor, causes the processor to:
determine a first body-stability based normal force adjustment at the first axle and a second body-stability based normal force adjustment at the second axle.

13. The tangible, non-transitory, machine-readable medium of claim 12, wherein the tangible, non-transitory, machine-readable medium further comprising machine-readable instructions, that when executed by the processor, causes the processor to:
fuse the first tire-capacity normal force adjustment, the first understeer angle-based normal force adjustment, the first wheel-stability based normal force adjustment, and the first body-stability based normal force adjustment to determine the first requested normal force adjustment; and
fuse the second tire-capacity normal force adjustment, the second understeer angle-based normal force adjustment, the second wheel-stability based normal force adjustment, and the second body-stability based normal force adjustment to determine the second requested normal force adjustment.

14. The tangible, non-transitory, machine-readable medium of claim 9, wherein the tangible, non-transitory, machine-readable medium further comprising machine-readable instructions, that when executed by the processor, causes the processor to:
use a neural network to fuse the first requested normal force at the first axle of the vehicle with the first requested normal force adjustment and to fuse the second requested normal force with the second requested normal force adjustment.

15. A vehicle, comprising:
a vehicle body;
a first axle coupled to the vehicle body;
a second axle coupled to the vehicle body;
a plurality of sensors disposed within the vehicle body;
a first aerodynamic actuator coupled to the vehicle body, wherein the first aerodynamic actuator includes a first aerodynamic body movable relative to the vehicle body;
a second aerodynamic actuator coupled to the vehicle body, wherein the second aerodynamic actuator includes a second aerodynamic body movable relative to the vehicle body; and
a vehicle controller disposed within the vehicle body, wherein the vehicle controller is in communication with the plurality of sensors, and the vehicle controller is programmed to:
receive sensor data from the plurality of sensors,
use a physics-based feedforward control to determine a first requested normal force at the first axle of the vehicle and a second requested normal force at the second axle of the vehicle using the sensor data, wherein the physics-based feedforward control calculates required front and lateral forces to achieve desired lateral acceleration based on steering input and vehicle velocity;
use a feedback control to determine a first requested normal force adjustment at the first axle of the vehicle and a second requested normal force adjustment at the second axle of the vehicle using the sensor data, wherein the feedback control includes sub-control modules that independently calculate adjustments using tire-friction ellipse margin, axle stability, body stability, and wheel stability;
fuse the first requested normal force at the first axle of the vehicle with the first requested normal force adjustment to determine a first-adjusted normal force request at the first axle by adding the first requested normal force adjustment to the first requested normal force to determine a first-adjusted normal force request at the first axle;
fuse the second requested normal force with the second requested normal force adjustment to determine a second-adjusted normal force request at the second axle by adding the second requested normal force adjustment to the second requested normal force to determine a second-adjusted normal force request at the second axle;
determine a first position of the first aerodynamic body relative to the vehicle body and a second position of the second aerodynamic body relative to the vehicle body based on the first-adjusted normal force request and the second-adjusted normal force request, respectively;
command the first aerodynamic actuator to move the first aerodynamic body to the first position relative to the vehicle body; and
command the second aerodynamic actuator to move the second aerodynamic body to the second position relative to the vehicle body.

16. The vehicle of claim 15, wherein the vehicle controller is programmed to determine a first tire-capacity normal force adjustment at the first axle and a second tire-capacity normal force adjustment at the second axle.

17. The vehicle of claim 16, wherein the vehicle controller is programmed to determine a first understeer angle-based normal force adjustment at the first axle and a second understeer angle-based normal force adjustment at the second axle.

18. The vehicle of claim 17, wherein the vehicle controller is programmed to determine a first wheel-stability based normal force adjustment at the first axle and a second wheel-stability based normal force adjustment at the second axle.

19. The vehicle of claim 18, wherein the vehicle controller is programmed to determine a first body-stability based normal force adjustment at the first axle and a second body-stability based normal force adjustment at the second axle.

20. The vehicle of claim 19, wherein the vehicle controller is programmed to:
   fuse the first tire-capacity normal force adjustment, the first understeer angle-based normal force adjustment, the first wheel-stability based normal force adjustment, and the first body-stability based normal force adjustment to determine the first requested normal force adjustment; and
   fuse the second tire-capacity normal force adjustment, the second understeer angle-based normal force adjustment, the second wheel-stability based normal force adjustment, and the second body-stability based normal force adjustment to determine the second requested normal force adjustment.

* * * * *